(12) United States Patent
Baer

(10) Patent No.: US 12,170,976 B2
(45) Date of Patent: Dec. 17, 2024

(54) GENERATION OF INFORMATION RELATED TO GEOGRAPHICAL AREA

(71) Applicant: Telia Company AB, Solna (SE)

(72) Inventor: Anders Baer, Årsta (SE)

(73) Assignee: TELIA COMPANY AB, Solna (SE)

( * ) Notice: Subject to any disclaimer, the term of this patent is extended or adjusted under 35 U.S.C. 154(b) by 341 days.

(21) Appl. No.: 17/677,519

(22) Filed: Feb. 22, 2022

(65) Prior Publication Data

US 2022/0272655 A1    Aug. 25, 2022

(30) Foreign Application Priority Data

Feb. 23, 2021   (FI) .................................... 20215202

(51) Int. Cl.
*H04W 64/00* (2009.01)

(52) U.S. Cl.
CPC .................................. *H04W 64/00* (2013.01)

(58) Field of Classification Search
CPC .. H04L 63/0245; H04W 12/02; H04W 12/63; H04W 4/021; H04W 64/00; H04W 64/006

See application file for complete search history.

(56) References Cited

U.S. PATENT DOCUMENTS

| 2008/0255754 A1 | 10/2008 | Pinto |
| 2010/0197318 A1 | 8/2010 | Petersen et al. |
| 2011/0105077 A1 | 5/2011 | Chandrasekaran |
| 2012/0322458 A1 | 12/2012 | Shklarski et al. |
| 2013/0244696 A1* | 9/2013 | Schmidt ................ G01S 5/0027 455/456.2 |
| 2013/0252635 A1* | 9/2013 | Zheng ..................... H04L 67/52 455/456.2 |
| 2016/0345176 A1* | 11/2016 | DeWitt ................. H04W 4/029 |
| 2018/0309592 A1 | 10/2018 | Stolfus |

FOREIGN PATENT DOCUMENTS

| WO | 2007/103180 | 9/2007 |
| WO | 2019/241161 | 12/2019 |
| WO | 2020/073161 A1 | 4/2020 |

OTHER PUBLICATIONS

Finish Search Report dated Oct. 5, 2021, in connection with corresponding Finish Application No. 20211502 (1 pp.).

* cited by examiner

*Primary Examiner* — Timothy X Pham
(74) *Attorney, Agent, or Firm* — NIXON & VANDERHYE

(57) ABSTRACT

Disclosed is a method for generating information indicative of objects in a geographical area, the method includes: receiving a request; determining a number of positioning services for inquiring the data in accordance with the data in the request; generating a request for information; modifying the received information from the determined number of positioning services by filtering out privacy related information in relation to objects in the geographical area; and generating a response to the requesting entity. Also disclosed is an apparatus, a system, and a computer program product.

16 Claims, 3 Drawing Sheets

GENERATION OF INFORMATION RELATED TO GEOGRAPHICAL AREA

This application claims priority to FI Patent Application No. 20215202 filed Feb. 23, 2021, the entire contents of which are hereby incorporated by reference.

TECHNICAL FIELD

The invention concerns in general the technical field of telecommunications. More particularly, the invention concerns monitoring solutions.

BACKGROUND

The modern communication technology allows a monitoring of objects, such as mobile terminals, within a geographical area. The monitoring is typically performed so that a position of a mobile terminal is determined by applying either network based positioning or terminal based positioning and the position information is provided to a service so as to enable the user of the mobile terminal to enjoy position dependent services, for example. An example of this kind of service is disclosed in a document WO 2019/241161 A in which emergency data is provided to an appropriate authority based on a location of an electronic device from which an emergency alert is received.

The development of communication technologies has led to a situation it may be possible to receive position data of one or more mobile terminals from a plurality of sources, such as positioning services. However, different sources of the position data may be accessed with different privileges, and, hence, the services requiring the position data may not access a plurality of sources of the position data and as a result the services may not function optimally. Moreover, another situation may be that the position data received from the plurality of sources contains data by means of which the objects, or the users, may be identifiable and that may not comply with regulations e.g. in a certain area or in a country. This kind of situation may e.g. occur when the service requesting the position information aims to provide general information on objects in a geographical area under interest.

Hence, there is a need to introduce solutions which allow a generation of information relating to a certain geographical area in a sophisticated manner.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An object of the invention is to present a method, an apparatus, a system, and a computer program product for generating information indicative of objects in a geographical area.

The objects of the invention are reached by a method, an apparatus, a system, and a computer program product as defined by the respective independent claims.

According to a first aspect, a method for generating information indicative of objects in a geographical area is provided, the method, performed by an apparatus, comprises: receiving a request for information indicative of the objects in a geographical area from a requesting entity, the request comprising data defining the geographical area under interest and an accuracy of the requested information; determining a number of positioning services for inquiring the data in accordance with the data in the request; generating a request for information to the determined number of positioning services, the request at least comprising data defining the geographical area under interest at least in part; modifying, in response to a receipt of information from the determined number of positioning services, the received information from the determined number of positioning services by filtering out privacy related information in relation to objects in the geographical area defined in the received information from the determined number of positioning services; and generating a response to the requesting entity, the response comprising the modified information being indicative of objects in the geographical area.

For example, the determination of positioning services for inquiry may be performed by selecting the positioning services having a capability to provide information from the geographical area as defined in the request and with the accuracy of the requested information. The selection may e.g. be performed on a basis of data received from data storage in response to an inquiry to the data storage.

The request for information to the determined number of positioning services may further comprise data defining an accuracy of the requested data.

Moreover, the modification of the received information from the determined number of positioning services may further comprise at least one of: combining the received information from a plurality of positioning services; combining the received information from a plurality of positioning services by filtering out the same objects; adjusting the received information to meet the accuracy as defined in the request received from the requesting entity; generating the information being indicative of objects with a prediction model over a time window by applying history data with the received information from the determined number of positioning services.

For example, the objects in the geographical area may refer to mobile terminals. The mobile terminals may be identified on a basis of a subscription associated to the mobile terminal.

According to a second aspect, an apparatus for generating information indicative of objects in a geographical area is provided, the apparatus comprising: at least one processor; at least one memory including computer program code; the at least one memory and the computer program code configured to, with the at least one processor, cause the apparatus to perform: receive a request for information indicative of the objects in a geographical area from a requesting entity, the request comprising data defining the geographical area under interest and an accuracy of the requested information; determine a number of positioning services for inquiring the data in accordance with the data in the request; generate a request for information to the determined number of positioning services, the request at least comprising data defining the geographical area under interest at least in part; modify, in response to a receipt of information from the determined number of positioning services, the received information from the determined number of positioning services by filtering out privacy related information in relation to objects in the geographical area defined in the received information from the determined number of positioning services; and generate a response to the requesting entity, the response comprising the modified information being indicative of objects in the geographical area.

The apparatus may be caused to perform the determination of the number of the positioning services for inquiry by selecting the positioning services having a capability to provide information from the geographical area as defined in the request and with the accuracy of the requested information. For example, the apparatus may be caused to perform the selection on a basis of data received from data storage in response to an inquiry to the data storage.

The apparatus may be caused to receive the request for information to the determined number of positioning services, the request further comprising data defining an accuracy of the requested data.

The apparatus may also be caused to perform the modification of the received information from the determined number of positioning services by at least one of: combining the received information from a plurality of positioning services; combining the received information from a plurality of positioning services by filtering out the same objects; adjusting the received information to meet the accuracy as defined in the request received from the requesting entity; generating the information being indicative of objects as a prediction model over a time window by applying history data with the received information from the determined number of positioning services.

Moreover, the apparatus may be caused to detect the objects in the geographical area as mobile terminals. For example, the apparatus may be caused to identify the mobile terminals on a basis of a subscription associated to the mobile terminal.

According to a third aspect, a system for generating information indicative of objects in a geographical area is provided, the system comprising: a number of positioning services; an apparatus according to the second aspect as defined above.

According to a fourth aspect, a computer program product for generating information indicative of objects in a geographical area is provided which computer program product, when executed by at least one processor, cause an apparatus to perform the method according to the first aspect as defined above.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
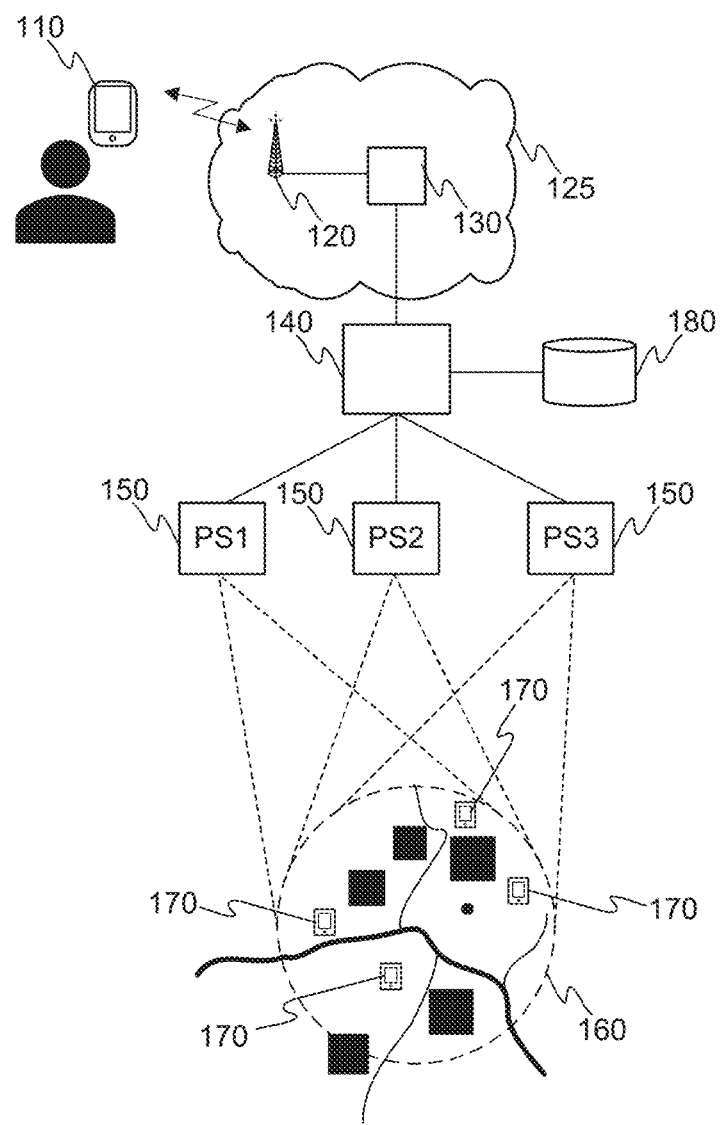
FIG. 1 illustrates schematically a communication system according to an example.

FIG. 1 illustrates schematically a communication system into which the present invention is implemented by a way of an example. The communication system may be configured so that it enables a generation of information indicative of objects 170 in a geographical area 160, or in a geographical space in 3-dimensional sense. The entity called the object 170 shall be understood as any apparatus suitable to be monitored with any manner by means of which a position of the object 170 may be determined. For example, the position may be determined by the object 170 itself e.g. by utilizing one or more capabilities arranged in the object for the determination of the position. This may e.g. refer to any positioning solution performed by the object, such as a positioning system utilizing signals received from satellites e.g. by utilizing a Global Navigation Satellite System (GNSS), such as Global Positioning System (GPS), or a mobile communications network, for example. Alternatively or in addition, the determination of the position may be performed internally by the object 170 itself, e.g. by deriving data from the environment, such as capturing an image of a predefined entity indicative of the position, like a QR code from which the position may be derived either directly or indirectly through processing the data of the code in a computing entity, or by receiving an input from a user of the object 170, the input being indicative of the position. The data indicative on the position of the object 170 may be delivered to at least one positioning service (PS1, PS2, PS3) 150 configured to receive the position data generated by the object. Alternatively or in addition to the position data generated by the object 170 the position may be determined by an external entity called as the positioning service 150. The positioning service 150 may utilize a capability of a communication network, such as a mobile communications network, to determine a position of the object in a service area of the communication network, for example. Another example of the communication network may be a wireless local area network (WLAN) configured to maintain data on apparatuses, i.e. objects 170, communicatively connected to the wireless local area network. Any other network based positioning method, and system, may be utilized for generating information on the objects in the geographical area 160 in question. It is also worthwhile to mention that there may exist a plurality of systems suitable for monitoring one or more objects in the geographical area 160 which may implement the monitoring in overlapping manner. The overlapping manner shall be understood in the context of the present invention to cover both that the different positioning services 150 may provide information on areas overlapping at least in part, but also objects 170 monitorable by one or more of the positioning services 150.

Another aspect is that the positioning services 150 may be configured to implement the positioning with certain accuracies being the same at least in part between the different positioning services 150 or differing with each other. Information of the accuracy of the respective positioning services 150 may be available by inquiring the information from the positioning services 150 or it may be derivable from data generated by the positioning services 150. Alternatively or in addition, it may be maintained in data storage accessible by authorized entities, such as an apparatus 140 as described in the forthcoming description.

The positioning service 150 shall be understood in a broad manner in the context of the present invention to cover both a system comprising a plurality of interconnected apparatuses for generating the position data with or without a help of the object 170 and a single apparatus, such as data storage, configured to store the position data accessible by external entities, such as the apparatus 140 wherein the position data is input to the data storage by another entity, such by an apparatus operating as the object 170.

As described, the communication system as schematically illustrated in FIG. 1 may comprise, or at least access to, a number of positioning services 150 which may generate position related information on one or more predefined geographical areas 160. Now, the apparatus 140 may be configured to perform inquiries of information to the number of positioning services 150 in response to a request received from a requesting entity 110. The requesting entity 110 may refer to any apparatus, or to any system, which may request information derivable either directly or indirectly from data available from the number of positioning services 150. For example, the requesting entity 110 may be a mobile terminal communicatively connected to a mobile communication network 125. The mobile communication network 125 may comprise a radio access network 120 and a core network 130 wherein the radio access network 120 may provide the wireless network coverage to the requesting entity 110, such as the mobile terminal. The core network 130 may, according to the present example, connect entities external to the mobile communication network 125 to the mobile communication network 125 and, thus, to the requesting entity 110. For sake of completeness it is worthwhile to mention that at least one of the positioning services 150 may be an internal function of the mobile communication network 125, and, hence, under control of a control function typically arranged in the core network 130.

The apparatus referred with 140 in FIG. 1 may be a standalone device or it may refer to a distributed computing system comprising a plurality of devices configured to interact together for operating in a manner as is described herein. The apparatus 140 may e.g. be a server device configured to receive inquiries and to perform operations in order to generate data suitable for providing as a response to the inquiries.

Next, a method in accordance with an example is described for providing aspects relating to the present invention. The method according to the example is described from a point of the apparatus 140 which is at least configured to generate information indicative if one or more objects 170 resides in a geographical area 160. First, the apparatus 140 may receive 210 a request for information indicative of the objects 170 in the geographical area 160 from a requesting entity 110. The requesting entity 110 may e.g. be a mobile terminal associated to a certain operation for which there is need to gather information regarding the geographical area in question. The request may comprise, according to an example, data defining the geographical area under interest and an accuracy of the requested information. The data defining the geographical area under interest may e.g. refer to a position defined as coordinates in a predefined coordinate system, such as in a geographic coordinate system. The position may be defined as a point in a 2-dimensional coordinate system or even as a point in a 3-dimensional coordinate system, for instance. Hence, data may define a latitude, longitude, and even an altitude of the position in question. The term position, i.e. the point of interest, shall be understood also to define an area or a volume (cf. space) in the coordinate system which may e.g. be arranged so that the data defines a plurality of discrete points defining together the area or the volume. Any other way to define the area or the volume of interest may be applied to. Worthwhile to mention is that the position may also be defined as a chain of positions, possibly also defining a range around the chain of positions, which chain of positions e.g. define a route under interest in a geographical area. As mentioned, the data in the request also comprises data defining an accuracy of the requested information. In other words, the request may comprise data by means of which it is possible to define an accuracy of information the requesting entity 110 expects to receive from the apparatus 140. This may refer to data which defines how accurately a position of the one or more objects shall be defined within the geographical area 160. The definition for accuracy may also comprise an indicator defining that a certain parameter, such as altitude, is obligatory to receive in the requested information. Still further, in some implementations the accuracy of the positioning system may relate to capability to provide information on a relative distance of objects 170 to a device intended to be used within the geographical area, or space, such as an unmanned aerial vehicle (UAV), since such distance may be defined with regulatory means. In other words, the definition representing the accuracy of the requested information may define a capability of the positioning system 150 to provide the requested information. The accuracy may be defined by also using other parameters that the accuracy of the positioning system as such. Namely, in some cases the data defining the accuracy may comprise parameters defining an instant of time, such as a time window, for the requested information. The time frame may e.g. extend from the current instant of time to the future over a predefined period of time.

Next, the apparatus 140 may be configured to determine 220 a number of positioning services for inquiring the data in accordance with the data in the request. This refers to an implementation wherein the apparatus 140 obtains the data in the request and at least determines the geographical area 160 on which the information is requested and selects, as candidate sources of data, those positioning services 150 which may provide information on objects 170 in the requested geographical area 160. In accordance with a first example, the apparatus 140 may use the candidates fulfilling the requirement of being capable of providing the information on the geographical area 160 as defined in the request. In other words, the apparatus 140 may, according to such an example, to proceed to step 230 with the candidates. However, according to another example, the apparatus 140 may be configured to obtain the data defining the requested accuracy and to select, from the candidate sources of information obtained in the first process as described above, those which may provide the information on the requested accuracy. The selection of the positioning services 150 may be performed by applying the different criteria being the parameters in the data of the request in any order so as to find the positioning services 150 fulfilling the requirements. In some example embodiments, the selection procedure may be adjusted so that if the outcome of the determination 220 e.g.

through the selection process is that none of the positioning services 150 is able to provide the requested information, the apparatus is configured to select the one which is able to provide the information closest to the requested. This kind of approach may be implemented so that the apparatus 140 is configured to apply a predefined scoring scheme for each evaluated positioning service candidate and the one which has gained the highest scores is selected even if it does not fulfill all the requested requirements defined in the data received in the request.

For the determination 220 of the positioning services 150 in the described manner the apparatus 140 may be configured to access data defining the capability of the positioning services 150 with respect to the mentioned parameters. The access of data may refer to a generation of an inquiry to data storage 180 configured to store and maintain the data of the positioning services 150. For example, the data storage 180 may be a database into which the positioning services may input information on their capabilities. This may e.g. be performed automatically by the positioning services 150 under a predefined scheme or by inquiring the information from the positioning services 150 regularly by the data storage 180. Alternatively or in addition, the apparatus 140 may be configured to, e.g. in response to the receipt 210 of the request, consult the positioning services 150 if they are able to provide the information or not.

In response to the determination 220 of the positioning services 220 the apparatus 140 may be configured to generate 230 a request for information to the determined number of positioning services 150. In accordance with an example, the request may at least comprise data defining the geographical area 160 under interest at least in part. The data may define the geographical area 160 in the same manner as defined in the original request received 210 from the requesting entity. Alternatively or in addition, the apparatus 140 may be configured to modify the definition of the geographical area 160 to meet the way the information is maintained in the respective positioning service 150, or services 150 so as to allow the respective positioning service 150 to apply the definition in the data.

Next, in response to a receipt of information from the determined number of positioning services 150 the apparatus 140 may be configured to modify 240 the received information from the determined number of positioning services 150. The modification 240 of the received information comprises at least filtering out privacy related information in relation to objects 170 in the geographical area 160 which are defined in the received information from the determined number of positioning services 150. Since the positioning services 150 may possess object related data identifying the objects 170, and/or their users, the apparatus 140 may be configured to remove the privacy related information, such as any identifier, associated to one or more objects 170 included in the response, or responses, from the positioning services 150. The removal of the privacy related data may e.g. be performed by filtering out data in a predefined data field in each data entry representing the object 170 in the data received from the number of positioning services 150. Furthermore, the modification may further comprise at least one of: combining the received information from the plurality of positioning services 150; combining the received information from the plurality of positioning services 150 by filtering out the objects 170 which were identified in the data received from a plurality of positioning services 150 so as to not listing the same object 170 in a plurality of occurrences.

Finally, the modified information is transmitted to the requesting entity 110 by generating 250 a response to the requesting entity 110 wherein the response comprises the modified information being indicative of objects in the geographical area 170.

For sake of completeness, the method, or at least some steps of it, as described may be repeated in accordance with a need during a certain operation. For example, if the present invention is applied in an application area wherein it is necessary to have up-to-date information, even in real-time, the method may be repeated frequently during the operation. Such a need may e.g. rise when the invention is applied in an application area having impact to a safety if something goes wrong. A non-limiting example of such an application area may be flying unmanned aerial vehicles in a certain geographical area 160 wherein may be defined some rules for the operation.

In some example embodiments, the apparatus 140 may be configured to modify the received information from the positioning services 150 so that an accuracy from each of the positioning services 150 is adjusted to be on the same level meeting the requirement defined in the request originally received from the requesting entity 110. This kind of approach may be advantageous if one or more of the positioning services 150 is capable of providing the information on a more accurate level than the requesting entity 110 is requesting it. In order to make the information received from the plurality of positioning services 150 compatible with each other and in this manner to reduce any necessary computation at the end of the requesting entity 110, the apparatus 140 may be configured to perform the adjustment accordingly. This kind of approach also allows an implementation in which the accuracy of the requested information is not taken into account when selecting the positioning services 150 to which the request for information is generated, as mentioned above as an embodiment of the solution. Hence, the apparatus 140 may be configured to request the information from all the positioning services 150 capable of providing the information on the defined geographical area 160, and in response to a receipt of the information from the positioning services 150, the apparatus 140 performs the filtering, but also the adjustment, in accordance with the accuracy requirement.

For example, the objects 170 in the geographical area 160 may refer to mobile terminals residing and roaming in the geographical area 160. An identification of the mobile terminals may be performed on a basis of a subscription associated to the mobile terminal which subscription is assigned with an identifier usable in the mobile communication network. The identifier may e.g. be a MSISDN. Hence, the positioning system 150 of the mobile communication network may provide information with respect to the objects 170 in the geographical area 160 comprising the identifier of the subscription which may filtered out with the mechanism according to the present invention for responding to the party requesting the information.

Figure 3:
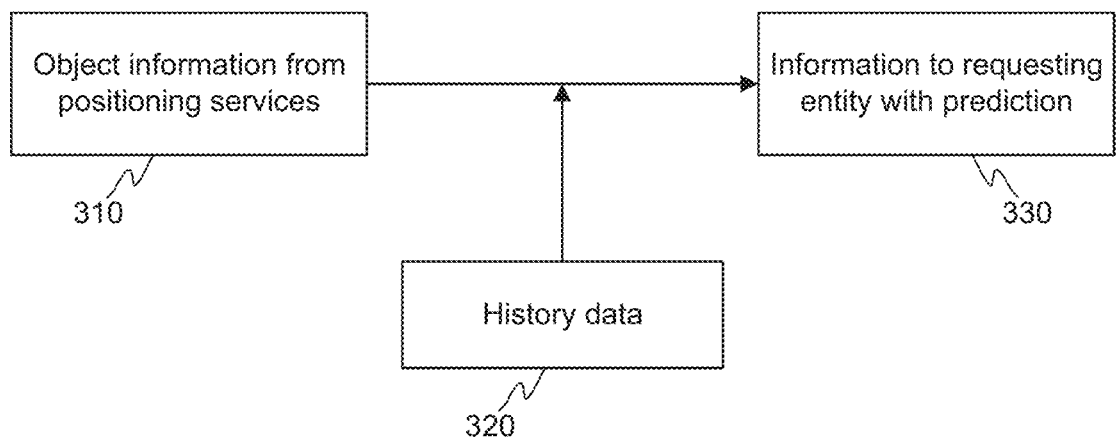
FIG. 3 illustrates schematically an implementation according to an example.

As mentioned, in some examples the request received from the requesting entity 110 may define further parameters with respect to information indicative of objects 170 in the geographical area 160 under interest. As also mentioned, the request may comprise a definition for a time window over which the information is requested to. In such an example, the apparatus 140 may be configured to operate as schematically illustrated in FIG. 3. Namely, it may receive the information on the objects 170 in the geographical area 160 (cf. reference 310 in FIG. 3), but since the request defined the time frame under interest, the apparatus 140 may be configured to obtain history data (cf. reference 320 in FIG. 3) indicative of objects in the same geographical area 160 over the same time window in an earlier instant of time, such as previous day, or at the same day in previous week. The history data may also be any statistical representation of the geographical area 160. Advantageously, the history data is defined as a model indicative of a change of object over the time window into which model the starting value of the objects may be input as the parameter, and by applying the model it generates a representation of the change in a number of objects within the geographical area 160 over the time window with the input value received from the at least one positioning service 150 which may be delivered as the information to the requesting entity 110 (cf. reference 330 in FIG. 3). In this manner it is possible to establish a predictive model to be applied by the requesting entity 110.

Figure 2:
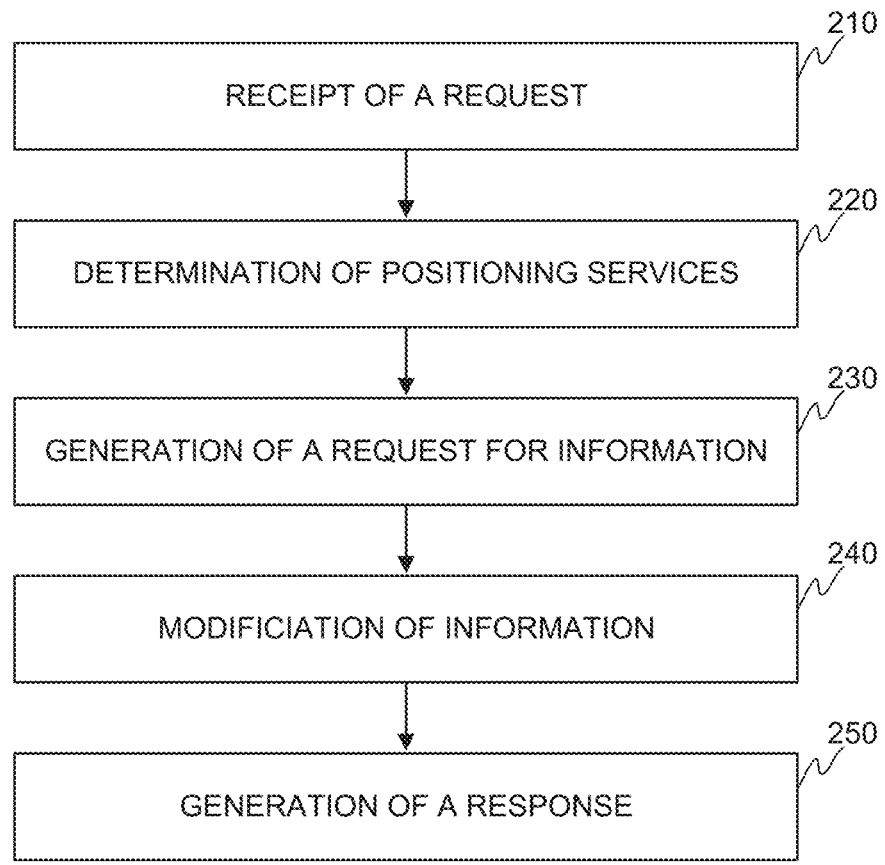
FIG. 2 illustrates schematically a method according to an example.

According to still another example, the apparatus 140 may be configured to obtain further data, such as relating to local regulation and/or rules, which data may have impact on the modification of the data received, or even inquired, from the one or more positioning services 150. Hence, depending on an example, the apparatus 140 may be configured to inquire, either prior to step 220, or step 230, or step 240 as illustrated in FIG. 2, from a predefined source, such as from a database or a server, predefined information, such as local rules or regulations, which may then be applied in the method. For example, the inquired information may have impact to a selection of the positioning services 220 or alternatively or in addition to a modification of the information so as to generate, by the apparatus 140, a response complying with the local regulations.

Figure 4:
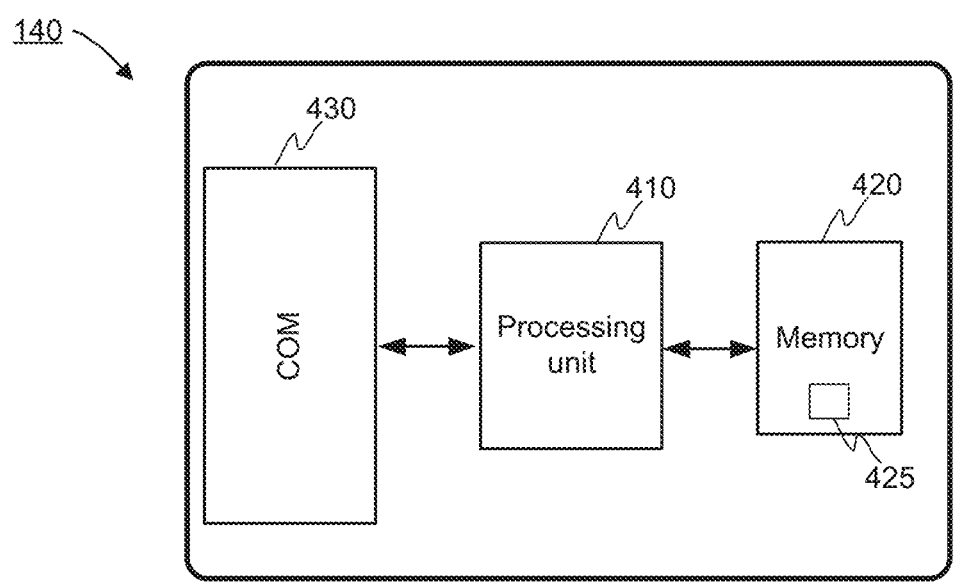
FIG. 4 illustrates schematically an apparatus according to an example.

An example of an apparatus 140 suitable for performing at least a part of the method according to an example is schematically illustrated in FIG. 4. The execution of the method, or at least some portions of it, may be achieved by arranging at least one processor 410 to execute at least some portion of computer program code 425 stored in at least one memory 420 causing the processor 410, and, thus, the apparatus 140 to implement one or more method steps as described. In other words, the processor 410 may be arranged to access the memory 420 and to retrieve and to store any information therefrom and thereto. Moreover, the processor 410 may be configured to control a communication through one or more communication interfaces 430 for accessing the other entities being involved in the operation. Hence, the communication interface 430 may be arranged to implement, possibly under control of the processor 410, corresponding communication protocols, such as an IP, for communicating with one or more entities, such as with the positioning services 150 and the mobile communication network. The term communication interface 430 shall be understood in a broad manner comprising necessary hardware and software elements for implementing the communication techniques. Further, the apparatus 140 in question may comprise one or more input/output devices 440 for inputting and outputting information. Such input/output devices may e.g. be keyboard, buttons, touch screen, display, loudspeaker, microphone camera and so on. In some implementation of the apparatus 140 at least some of the input/output devices may be external to the apparatus 140 and coupled to it either wirelessly or in a wired manner. For sake of clarity, the processor 410 herein refers to any unit or a plurality of units suitable for processing information and control the operation of the apparatus 140 in general at least in part, among other tasks. The mentioned operations may e.g. be implemented with a microcontroller solution with embedded software. Similarly, the invention is not limited to a certain type of memory 420, but any memory unit or a plurality of memory units suitable for storing the described pieces of information, such as portions of computer program code and/or parameters, may be applied in the context of the present invention. Moreover, at least the mentioned entities may be arranged to be at least communicatively coupled to each other with an internal data connection, such as with a data bus.

Some aspects of the present invention may relate to a computer program product which, when executed by at least one processor, cause an apparatus 140 to perform at least some portions of the method as described. For example, the computer program product may comprise at least one computer-readable nontransitory medium having the computer program code 425 stored thereon. The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

Still further, the computer program code 425 may comprise a proprietary application, such as computer program code for executing the generation of information indicative of the objects 170 in the manner as described.

Any of the programmed functions mentioned may also be performed in firmware or hardware adapted to or programmed to perform the necessary tasks.

Still further, some aspects of the present invention relate to a communication system configured to implement a generation of information indicative of objects 170 in a geographical area 160 in the manner as described.

A possible scenario for applying the present invention may be with unmanned aerial vehicles (UAV), such as with drones. Namely, there are introduced new regulations at least in some countries which regulations specify behavior the UAV pilot shall follow when operating the UAV. Some aspects of the regulations specify circumstances it is allowed to operate the UAV in areas where reside people wherein one aspect may be a number of people, cf. the objects 170, in the geographical area 160 in which the UAV is planned to fly. In this kind of scenario it is almost impossible for the UAV pilot to figure out the number of people with the geographical area 160 under interest especially when the geographical area 160 is wide. Hence, by applying the present invention the UAV pilot may provide, as an input, a flight plan of the UAV at least defining a route, e.g. as consecutive points in a predefined coordinate system, to the apparatus 140 as the request as described herein. The flight plan may also comprise a definition of an accuracy needed, but also data indicative of a time of the flight with the UAV, such as a starting time and an end time, or a duration of the flight with the starting time, or anything similar. In response to the receipt of information the apparatus 140 may be configured to operate in the manner as described. Also, if the accuracy also defines that an altitude of the objects 170 is an obligatory feature and only information from such positioning services 150 that are able to provide the altitude information, it is possible to filter out other UAVs in the geographical area 160 so as to determine an actual number of persons possessing a device represented as the objects 170. This, in turn, may have impact if it is allowed to execute an operation with the UAV in the area or not if the allowance is dependent on a number of persons in the area under operation. In accordance with the example in the scenario that the invention is applied with UAVs, the step of the modification of information 240 may comprise, prior to modification of the received information from the positioning services 150, a step in which the apparatus 140 is configured to obtain data from data storage, the data defining local regulations for operating the UAV. Based on the received information the modification 240 may comprise a step of determining if the received information provides information fulfilling the local regulations and generating an indication on this. Alternatively or in addition, the modification may also comprise that the received information is adjusted to comply with the local regulations in order to provide the UAV pilot necessary information to meet the local regulations. Further, the modification of information may comprise a generation of instructions to the UAV pilot for completing the flight plan, such as requesting to postpone it to a later instance of time, or anything similar.

Another possible scenario of implementing the present invention may be in a context of autonomous vehicles in an environment where a number of vehicles in an area is limited in accordance with a number of objects 170 in the same area wherein the number of objects may correspond to human beings in the area, but also to other autonomous vehicles in the area. The solution as described provides a mechanism to match the number of autonomous vehicles in the area to meet any limitations, or regulations, in that respect.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for generating information indicative of objects in a geographical area, the method, performed by an apparatus, comprises:
   receiving a request for information indicative of the objects in a geographical area from a requesting entity, the request comprising data defining the geographical area under interest and an accuracy of the requested information,
   determining a number of positioning services for inquiring the data in accordance with the data in the request,
   generating a request for information to the determined number of positioning services, the request at least comprising data defining the geographical area under interest at least in part,
   modifying, in response to a receipt of information from the determined number of positioning services, the received information from the determined number of positioning services by filtering out privacy related information in relation to objects in the geographical area defined in the received information from the determined number of positioning services, and
   generating a response to the requesting entity, the response comprising the modified information being indicative of objects in the geographical area.

2. The method of claim 1, wherein the determination of the number of positioning services for inquiry is performed by selecting the positioning services having a capability to provide information from the geographical area as defined in the request and with the accuracy of the requested information.

3. The method of claim 2, wherein the selection is performed on a basis of data received from data storage in response to an inquiry to the data storage.

4. The method of claim 1, wherein the request for information to the determined number of positioning services further comprising data defining an accuracy of the requested data.

5. The method of claim 1, wherein the modification of the received information from the determined number of positioning services further comprising at least one of: combining the received information from a plurality of positioning services; combining the received information from a plurality of positioning services by filtering out the same objects; adjusting the received information to meet the accuracy as defined in the request received from the requesting entity; generating the information being indicative of objects with a prediction model over a time window by applying history data with the received information from the determined number of positioning services.

6. The method of claim 1, wherein the objects in the geographical area refer to mobile terminals.

7. The method of claim 6, wherein the mobile terminals are identified on a basis of a subscription associated to the mobile terminal.

8. An apparatus for generating information indicative of objects in a geographical area, the apparatus comprising:
   at least one processor;
   at least one memory including computer program code;
   the at least one memory and the computer program code configured to, with the at least one processor, cause the apparatus to perform:
   receive a request for information indicative of the objects in a geographical area from a requesting entity, the request comprising data defining the geographical area under interest and an accuracy of the requested information,
   determine a number of positioning services for inquiring the data in accordance with the data in the request,
   generate a request for information to the determined number of positioning services, the request at least comprising data defining the geographical area under interest at least in part,
   modify, in response to a receipt of information from the determined number of positioning services, the received information from the determined number of positioning services by filtering out privacy related information in relation to objects in the geographical area defined in the received information from the determined number of positioning services, and
   generate a response to the requesting entity, the response comprising the modified information being indicative of objects in the geographical area.

9. The apparatus of claim 8, wherein the apparatus is caused to perform the determination of the number of positioning services for inquiry by selecting the positioning services having a capability to provide information from the geographical area as defined in the request and with the accuracy of the requested information.

10. The apparatus of claim 9, wherein the apparatus is caused to perform the selection on a basis of data received from data storage in response to an inquiry to the data storage.

11. The apparatus of claim 8, wherein the apparatus is caused to receive the request for information to the determined number of positioning services, the request further comprising data defining an accuracy of the requested data.

12. The apparatus of claim 8, wherein the apparatus is caused to perform the modification of the received information from the determined number of positioning services by at least one of: combining the received information from a plurality of positioning services; combining the received information from a plurality of positioning services by filtering out the same objects; adjusting the received information to meet the accuracy as defined in the request received from the requesting entity; generating the information being indicative of objects with a prediction model over a time window by applying history data with the received information from the determined number of positioning services.

13. The apparatus of claim 8, wherein the apparatus is caused to detect the objects in the geographical area as mobile terminals.

14. The apparatus of claim 13, wherein the apparatus is caused to identify the mobile terminals on a basis of a subscription associated to the mobile terminal.

15. A system for generating information indicative of objects in a geographical area, the system comprising:
   a number of positioning services,
   an apparatus comprising:
      at least one processor;
      at least one memory including computer program code;
      the at least one memory and the computer program code configured to, with the at least one processor, cause the apparatus to perform:
         receive a request for information indicative of the objects in a geographical area from a requesting entity, the request comprising data defining the geographical area under interest and an accuracy of the requested information,
         determine a number of positioning services for inquiring the data in accordance with the data in the request,
         generate a request for information to the determined number of positioning services, the request at least comprising data defining the geographical area under interest at least in part,
         modify, in response to a receipt of information from the determined number of positioning services, the received information from the determined number of positioning services by filtering out privacy related information in relation to objects in the geographical area defined in the received information from the determined number of positioning services, and
         generate a response to the requesting entity, the response comprising the modified information being indicative of objects in the geographical area.

16. A non-transitory computer-readable medium on which is stored a computer program for generating information indicative of objects in a geographical area which computer program, when executed by at least one processor, cause an apparatus to perform the method comprising:
   receiving a request for information indicative of the objects in a geographical area from a requesting entity, the request comprising data defining the geographical area under interest and an accuracy of the requested information,
   determining a number of positioning services for inquiring the data in accordance with the data in the request,
   generating a request for information to the determined number of positioning services, the request at least comprising data defining the geographical area under interest at least in part,
   modifying, in response to a receipt of information from the determined number of positioning services, the received information from the determined number of positioning services by filtering out privacy related information in relation to objects in the geographical area defined in the received information from the determined number of positioning services, and
   generating a response to the requesting entity, the response comprising the modified information being indicative of objects in the geographical area.

* * * * *